(12) United States Patent
Zhang et al.

(10) Patent No.: US 10,921,659 B2
(45) Date of Patent: Feb. 16, 2021

(54) PIXEL STRUCTURE, DRIVE METHOD THEREOF, DISPLAY PANEL, AND DISPLAY DEVICE

(71) Applicants: Hefei Xinsheng Optoelectronics Technology Co., Ltd., Anhui (CN); BOE Technology Group Co., Ltd., Beijing (CN)

(72) Inventors: Donghui Zhang, Beijing (CN); Xiaoye Ma, Beijing (CN); Rui Yin, Beijing (CN); Xiuli Si, Beijing (CN)

(73) Assignees: Hefei Xinsheng Optoelectronics Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/489,050

(22) PCT Filed: Nov. 15, 2018

(86) PCT No.: PCT/CN2018/115689
§ 371 (c)(1),
(2) Date: Aug. 27, 2019

(87) PCT Pub. No.: WO2019/114494
PCT Pub. Date: Jun. 20, 2019

(65) Prior Publication Data
US 2020/0004068 A1 Jan. 2, 2020

(30) Foreign Application Priority Data
Dec. 12, 2017 (CN) .......................... 2017 1 1320967

(51) Int. Cl.
*G06F 3/038* (2013.01)
*G09G 5/00* (2006.01)
*G02F 1/1362* (2006.01)
*G02F 1/163* (2006.01)
*G09G 3/36* (2006.01)

(52) U.S. Cl.
CPC ............ *G02F 1/1362* (2013.01); *G02F 1/163* (2013.01); *G09G 3/36* (2013.01); *G02F 2001/1635* (2013.01); *G02F 2201/123* (2013.01)

(58) Field of Classification Search
CPC .... G02F 1/1362; G02F 1/13624; G02F 1/163; G02F 2001/1635; G02F 2201/123;
(Continued)

(56) References Cited

U.S. PATENT DOCUMENTS

| 5,471,225 A | 11/1995 | Parks |
| 7,019,796 B2 | 3/2006 | Tsai et al. |

(Continued)

FOREIGN PATENT DOCUMENTS

| CA | 958794 A | 12/1974 |
| CN | 1030153 A | 1/1989 |

(Continued)

OTHER PUBLICATIONS

Jun. 28, 2020—(CN) First Office Action Appn 201711320967.8 with English Translation.

*Primary Examiner* — Insa Sadio
(74) *Attorney, Agent, or Firm* — Banner & Witcoff, Ltd.

(57) ABSTRACT

A pixel structure and a driving method thereof, a display panel and a display device are provided. The pixel structure includes a pixel electrode, a gate line, a data line, a first thin film transistor and a second thin film transistor. A gate electrode of the first thin film transistor is electrically connected with the gate line, a first electrode of the first thin film transistor is electrically connected with the data line; a gate electrode of the second thin film transistor is electrically connected with a first electrode of the second thin film transistor, the first electrode of the second thin film transistor is electrically connected with the pixel electrode, and a (Continued)

second electrode of the second thin film transistor is electrically connected with a second electrode of the first thin film transistor.

20 Claims, 15 Drawing Sheets

(58) Field of Classification Search
CPC ... G09G 2300/0809; G09G 2320/0223; G09G 3/2092; G09G 3/36; H01L 27/32
See application file for complete search history.

(56) References Cited

U.S. PATENT DOCUMENTS

2005/0285984 A1* 12/2005 Tsai .................. G02F 1/136204
　　　　　　　　　　　　　　　　　　　　　　　349/40
2014/0092333 A1* 4/2014 Li ........................ G02F 1/1362
　　　　　　　　　　　　　　　　　　　　　　　349/38

FOREIGN PATENT DOCUMENTS

| CN | 1089041 A | 7/1994 |
|---|---|---|
| CN | 1637831 A | 7/2005 |
| CN | 1892767 A | 1/2007 |
| CN | 100524750 C | 8/2009 |
| CN | 104298032 A | 1/2015 |
| CN | 104332138 A | 2/2015 |
| CN | 105467707 A | 4/2016 |
| JP | H06102530 A | 4/1994 |
| JP | 2012058335 A | 3/2012 |
| KR | 20130100498 A | 9/2013 |

* cited by examiner

PIXEL STRUCTURE, DRIVE METHOD THEREOF, DISPLAY PANEL, AND DISPLAY DEVICE

The application is a U.S. National Phase Entry of International Application No. PCT/CN2018/115689 filed on Nov. 15, 2018, designating the United States of America and claiming priority to Chinese Patent Application No. 201711320967.8, filed on Dec. 12, 2017. The present application claims priority to and the benefit of the above-identified applications and the above-identified applications are incorporated by reference herein in their entirety.

TECHNICAL FIELD

At least one embodiment of the present disclosure relates to a pixel structure and a driving method thereof, a display panel and a display device.

BACKGROUND

At present, flat panel display technology is developing rapidly. The flat display panel includes, for example, a liquid crystal display panel, an organic light emitting display panel, and the like. For example, a normal flat panel display panel includes a plurality of gate lines, a plurality of data lines, and a plurality of pixel units defined by the plurality of gate lines and the plurality of data lines crossing with each other; each of the plurality of pixel units includes a display electrode and a thin film transistor connected with the display electrode. The thin film transistor is used to control whether the display electrode performs a display function or not.

SUMMARY

At least one embodiment of the present disclosure provides a pixel structure, and the pixel structure comprises: a pixel electrode, a gate line, a data line, a first thin film transistor and a second thin film transistor. The first thin film transistor comprises a gate electrode, a first electrode and a second electrode; the second thin film transistor comprises a gate electrode, a first electrode and a second electrode; the gate electrode of the first thin film transistor is electrically connected with the gate line, the first electrode of the first thin film transistor is electrically connected with the data line; the gate electrode of the second thin film transistor is electrically connected with the first electrode of the second thin film transistor, the first electrode of the second thin film transistor is electrically connected with the pixel electrode, and the second electrode of the second thin film transistor is electrically connected with the second electrode of the first thin film transistor.

For example, the pixel structure provided by at least one embodiment of the present disclosure, further comprises a third thin film transistor comprising a gate electrode, a first electrode and a second electrode; the gate electrode of the third thin film transistor is electrically connected with the gate line, the first electrode of the third thin film transistor is electrically connected with the data line, and the second electrode of the third thin film transistor is electrically connected with the pixel electrode.

For example, in the pixel structure, a threshold voltage of the first thin film transistor is less than or equal to a threshold voltage of the third thin film transistor.

For example, an amount of the first thin film transistor is 1, and an amount of the second thin film transistor is 1.

For example, an amount of the first thin film transistor is 1, and an amount of the second thin film transistors is more than 1.

For example, an amount of the first thin film transistor is more than 1, and an amount of the second thin film transistor connected with each of the first thin film transistors is 1.

For example, an amount of the first thin film transistors is more than 1, and an amount of the second thin film transistors connected with each of the first thin film transistors is more than 1.

For example, in the pixel structure, reverse breakdown voltages of the plurality of second thin film transistors are same with each other.

For example, in the pixel structure, channel areas of the plurality of second thin film transistors are same with each other.

For example, in the pixel structure, reverse breakdown voltages of at least two of the plurality of second thin film transistors are different from each other.

For example, in the pixel structure, channel region areas of the at least two of the plurality of second thin film transistors are different from each other.

For example, in the pixel structure, the amount of the second thin film transistors is more than or equal to 3, and the reverse breakdown voltages of the plurality of second thin film transistors are distributed in a manner of equal difference.

For example, in the pixel structure, as the reverse breakdown voltage of the second thin film transistor increases, difference between the reverse breakdown voltages of every two second thin film transistors decreases.

At least one embodiment of the present disclosure further provides a display panel, and the display panel comprises the pixel structure provided by at least one embodiment of the present disclosure.

At least one embodiment of the present disclosure further provides a display decide, and the display device comprises the display panel provided by at least one embodiment of the present disclosure.

At least one embodiment of the present disclosure further provides a driving method, and the driving method is applied to the pixel structure provided by at least one embodiment of the present disclosure, the method comprises: applying a gate voltage to the gate line, and applying a data voltage to the data line; and controlling the gate voltage to be greater than or equal to a threshold voltage of the first thin film transistor and the data voltage to be greater than or equal to a reverse breakdown voltage of the second thin film transistor so that the pixel electrode is charged by the first thin film transistor and the second thin film transistor.

For example, the driving method further comprises: controlling the gate voltage to be less than the threshold voltage of the first thin film transistor, or controlling the gate voltage to be greater than or equal to the threshold voltage of the first thin film transistor and the data voltage to be less than the reverse breakdown voltage of the second thin film transistor, so that the pixel electrode is not charged by the first thin film transistor or the second thin film transistor.

For example, in the driving method, the pixel structure comprises a plurality of second thin film transistors, and reverse breakdown voltages of the plurality of second thin film transistors are different; the higher the data voltage is, the more second thin film transistors are turned on, and the faster the pixel electrode is charged.

For example, in the driving method, the pixel structure further comprises a third thin film transistor, and the third thin film transistor comprises a gate electrode, a first electrode and a second electrode; the gate electrode of the third thin film transistor is electrically connected with the gate line, the first electrode of the third thin film transistor is electrically connected with the data line, and the second electrode of the third thin film transistor is electrically connected with the pixel electrode; and the driving method further comprises controlling the gate voltage to be greater than or equal to a threshold voltage of the third thin film transistor so that the third thin film transistor is turned on and the pixel electrode is charged by the third thin film transistor.

For example, the driving method further comprises: controlling the gate voltage to be smaller than the threshold voltage of the third thin film transistor so that the third thin film transistor is not turned on and the pixel electrode is not charged by the third thin film transistor.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment (s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "In," "out" "on," "under," and the like are only used to indicate relative position relationship, and when the position of the object which is described is changed, the relative position relationship may be changed accordingly.

The figures in embodiments of the present disclosure are not drawn according to actual proportions or scales. An amount of the first thin film transistor and an amount of the second thin film transistor are not limited to those illustrated in the figures, specific sizes and amounts of the structures may be determined according to actual requirements, and the figures of the embodiments of the present disclosure are only schematic views.

Figure 1:
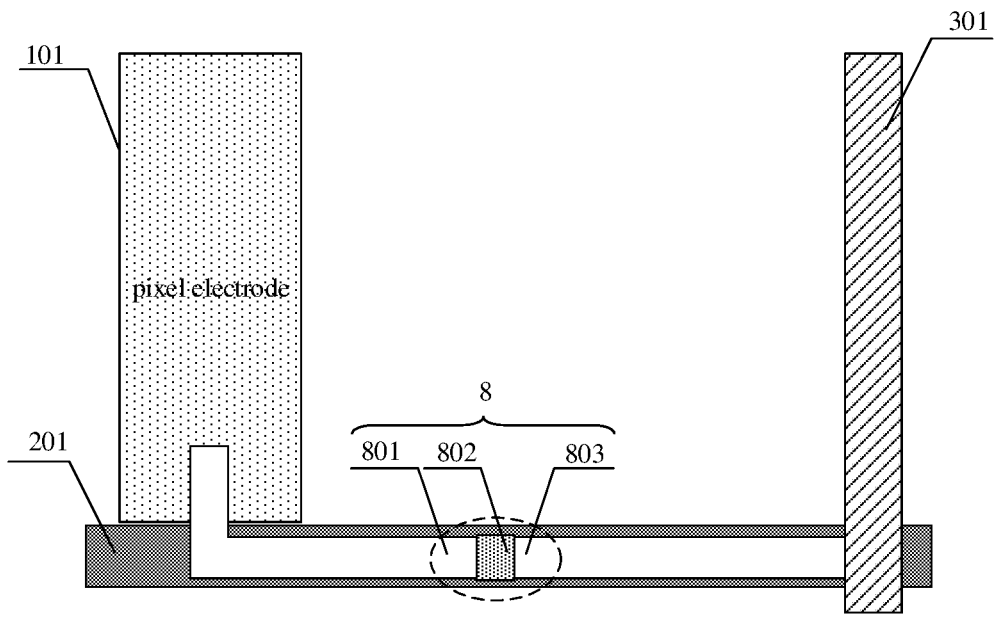
FIG. 1 is a plane schematic diagram of a pixel structure.

FIG. 1 is a plane schematic diagram of a pixel structure. The pixel structure includes a pixel electrode 101, a gate line 201, a data line 301, and a thin film transistor 8. The thin film transistor 8 includes a gate electrode 802, a drain electrode 801, and a source electrode 803. The gate electrode 802 is electrically connected with the gate line 201 and receives a gate signal from the gate line 201, and the gate signal for example is a gate voltage applied to the gate line 201. The source electrode 803 is electrically connected with the data line 301 and receives a data signal from the data line 301, and the data signal for example is a data voltage applied to the data line 301. If the gate voltage is greater than a threshold voltage of the thin film transistor, the thin film transistor 8 is turned on, and the data signal is transmitted to the pixel electrode 101 by the thin film transistor 8 to charge the pixel electrode 101, thus display is realized. For example, the pixel structure is located in a liquid crystal display panel, and the pixel structure further includes a common electrode (not shown in the figure). A deflection direction of liquid crystal molecules in a liquid crystal layer of the liquid crystal display panel changes with a change of a voltage applied between the pixel electrode 101 and the common electrode, thus a light passing rate of the liquid crystal layer is controlled and further a display gray scale of the pixel structure located in the liquid crystal display panel is controlled. Further, the voltage applied between the pixel electrode 101 and the common electrode is controlled by controlling the magnitude of the data voltage applied to the data line 301, thereby controlling the display gray scale of the pixel structure.

At least one embodiment of the present disclosure provides a pixel structure, and the pixel structure comprises: a pixel electrode, a gate line, a data line, a first thin film transistor and a second thin film transistor. The first thin film transistor comprises a gate electrode, a first electrode and a second electrode; the second thin film transistor comprises a gate electrode, a first electrode and a second electrode; the gate electrode of the first thin film transistor is electrically connected with the gate line, the first electrode of the first thin film transistor is electrically connected with the data line; the gate electrode of the second thin film transistor is electrically connected with the first electrode of the second thin film transistor, the first electrode of the second thin film transistor is electrically connected with the pixel electrode, and the second electrode of the second thin film transistor is electrically connected with the second electrode of the first thin film transistor.

The pixel structure according to at least one embodiment of the present disclosure includes the first thin film transistor and the second thin film transistor, and the pixel electrode is charged by the first thin film transistor and the second thin film transistor. Compared with the pixel structure illustrated in FIG. 1, the pixel structure according to at least one embodiment of the present disclosure achieves a charging of the pixel electrode more stable and reliable.

For example, the pixel structure provided by the embodiment of the present disclosure is in a display panel, such as a liquid crystal display panel, an organic light emitting display panel, and the like. For example, the liquid crystal display panel includes a plurality of gate lines, a plurality of data lines, and a plurality of pixel units defined by the plurality of gate lines and the plurality of data lines crossing with each other. For example, the pixel structure is one of the plurality of pixel units of the liquid crystal display panel. For example, each of the plurality of pixel units of the liquid crystal display panel adopts the pixel structure according to at least one embodiment of the present disclosure. For example, each of a part of the pixel units in the plurality of pixel units of the liquid crystal display panel adopts the pixel structure according to at least one embodiment of the present disclosure.

Figure 2A:
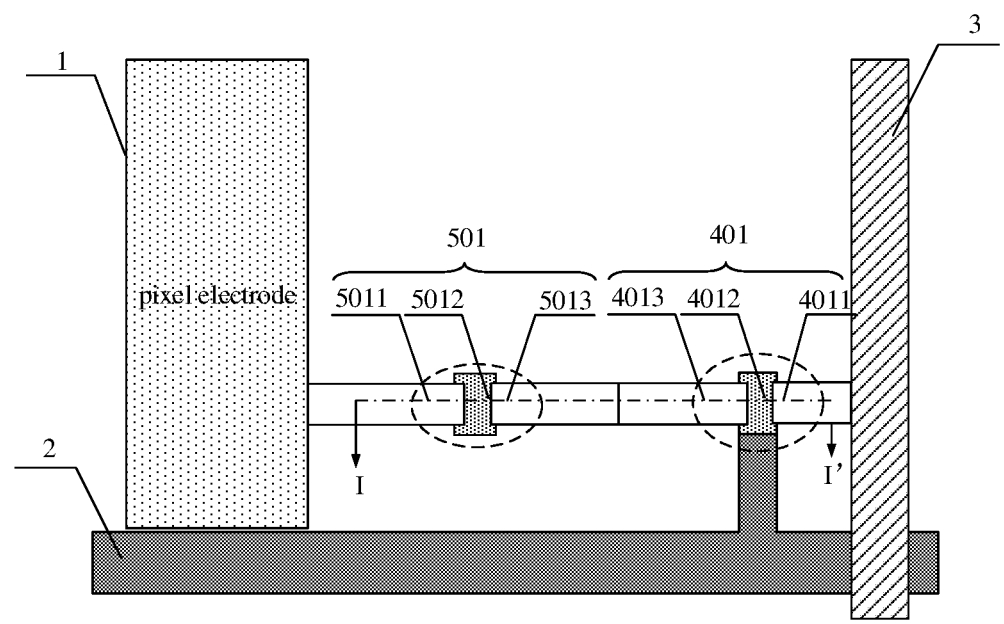
FIG. 2A is a plane schematic diagram of a pixel structure provided by at least one embodiment of the present disclosure.
Figure 2B:
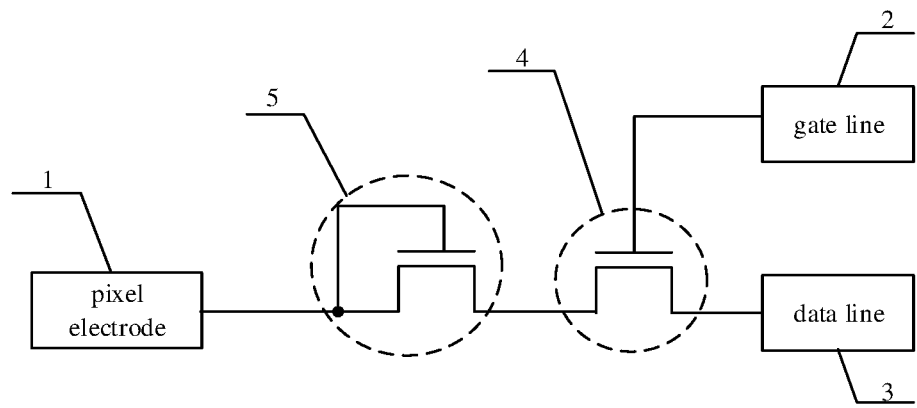
FIG. 2B is an equivalent circuit diagram of the pixel structure illustrated in FIG. 2A.

For example, FIG. 2A is a plane schematic diagram of the pixel structure provided by at least one embodiment of the present disclosure, and FIG. 2B is an equivalent circuit diagram of the pixel structure illustrated in FIG. 2A. As illustrated in FIG. 2A, the pixel structure 10 includes a pixel electrode 1, a gate line 2, a data line 3, a first thin film transistor 401 and a second thin film transistor 501. The first thin film transistor 401 includes a gate electrode 4012, a first electrode 4011 and a second electrode 4013. The gate electrode 4012 of the first thin film transistor is electrically connected with the gate line 2, and the first electrode 4011 of the first thin film transistor is electrically connected with the data line 3. A gate voltage applied to the gate line 2 is transmitted to the gate electrode 4012 of the first thin film transistor, and turn-on and turn-off of the first thin film transistor is controlled by controlling the magnitude of the gate voltage. The first thin film transistor 401 has a threshold voltage. If the gate voltage is greater than the threshold voltage of the first thin film transistor 401, the first thin film transistor 401 is turned on, and the first electrode 4011 of the first thin film transistor and the second electrode 4013 of the first thin film transistor are electrically connected with each other, so that a transmission of electrical signals is realized; if the gate voltage is less than the threshold voltage of the first thin film transistor 401, the first thin film transistor 401 is in an off state, that is, electrical signals cannot be transmitted from the first electrode 4011 of the first thin film transistor to the second electrode 4013 of the first thin film transistor.

The second thin film transistor 501 includes a gate electrode 5012, a first electrode 5011 and a second electrode 5013. The second electrode 5013 of the second thin film transistor is electrically connected with the second electrode 4013 of the first thin film transistor, so if the first thin film transistor 401 is turned on, a data voltage applied to the data line 3 is transmitted to the second electrode 5013 of the second thin film transistor by the first thin film transistor 401. The second thin film transistor 501 has a reverse breakdown voltage $V_d$. If a voltage difference between the second electrode 5013 of the second thin film transistor and the gate electrode 5012 of the second thin film transistor is greater than the reverse breakdown voltage $V_d$, the second thin film transistor 501 is broken down to be turned on. In the pixel structure 10, the gate electrode 5012 of the second thin film transistor is electrically connected with the first electrode 5011 of the second thin film transistor; if the data voltage transmitted to the second electrode 5013 of the second thin film transistor by the data line 3 and the first thin film transistor 401 is greater than the reverse breakdown voltage $V_d$, the second thin film transistor 501 is broken down to be turned on. Therefore, if the first thin film transistor 401 is turned on, turn-on and turn-off of the second thin film transistor 501 is controlled by controlling a magnitude of the data voltage. The first electrode 5011 of the second thin film transistor is electrically connected with the pixel electrode 1, therefore if the first thin film transistor 401 and the second thin film transistor 501 are simultaneously turned on, the data voltage is transmitted to the pixel electrode 1 by the first thin film transistor 401 and the second thin film transistor 501 to charge the pixel electrode 1, and the pixel unit where the pixel structure 10 is located realizes display; if any one of the first thin film transistor 401 and the second thin film transistor 501 is not turned on, that is, in an off state, the data voltage cannot be transmitted to the pixel electrode 1, the pixel electrode 1 is not charged, and the pixel unit where the pixel structure 10 is located is in a non-display state.

In at least one embodiment illustrated in FIG. 2A and FIG. 2B, for example, the pixel structure 10 is in the pixel unit of the liquid crystal display panel, and the voltage applied to the pixel electrode 1 is controlled by controlling the magnitude of the data voltage applied to the data line 3, thus a deflection direction of liquid crystal molecules is controlled to control a light passing rate of the liquid crystal layer, and further a display gray scale of each pixel unit of the liquid crystal display panel is controlled.

In the pixel structure according to at least one embodiment of the present disclosure, the pixel electrode 1 is charged by the first thin film transistor 401 and the second thin film transistor 501, that is, the charging process of the pixel electrode 1 is controlled by both the first thin film transistor 401 and the second thin film transistor 501, so that the charging process of the pixel electrode 1 is more stable and more reliable. For example, in the pixel structure illustrated in FIG. 1, the pixel electrode 101 may be erroneously charged due to a failure of the thin film transistor 8; however, in the pixel structure according to at least one embodiment of the present disclosure, because the charging process of the pixel electrode 1 is controlled by at least two thin film transistors, the problem of erroneous charging is effectively reduced or avoided.

For example, an amount of first thin film transistors is 1, and an amount of second thin film transistors is 1. The reverse breakdown voltage of the second thin film transistor 501 may be designed according to requirements, thus the gray scale of the display is controlled.

For the pixel structure illustrated in FIG. 1, if the data voltage is high, more electric charges are required to be transmitted during the charging process of the pixel electrode, which causes that a time for transmitting electrical signals from the data line to the pixel electrode increases, thus delay times of gray scale changes of the plurality of pixel units are inconsistent, thus a display image observed by human eyes flickers and a display quality is reduced. According to at least one embodiment of the present disclosure, by setting the total amount of the second thin film transistors to be more than 1 based on the pixel structure illustrated in FIG. 2A and FIG. 2B, display defects such as flickering of the display image seen by human eyes due to the delay of the signal transmission is effectively reduced or avoided.

In the following, cases where the total amount of second thin film transistors is more than 1 are described in detail.

Figure 3A:
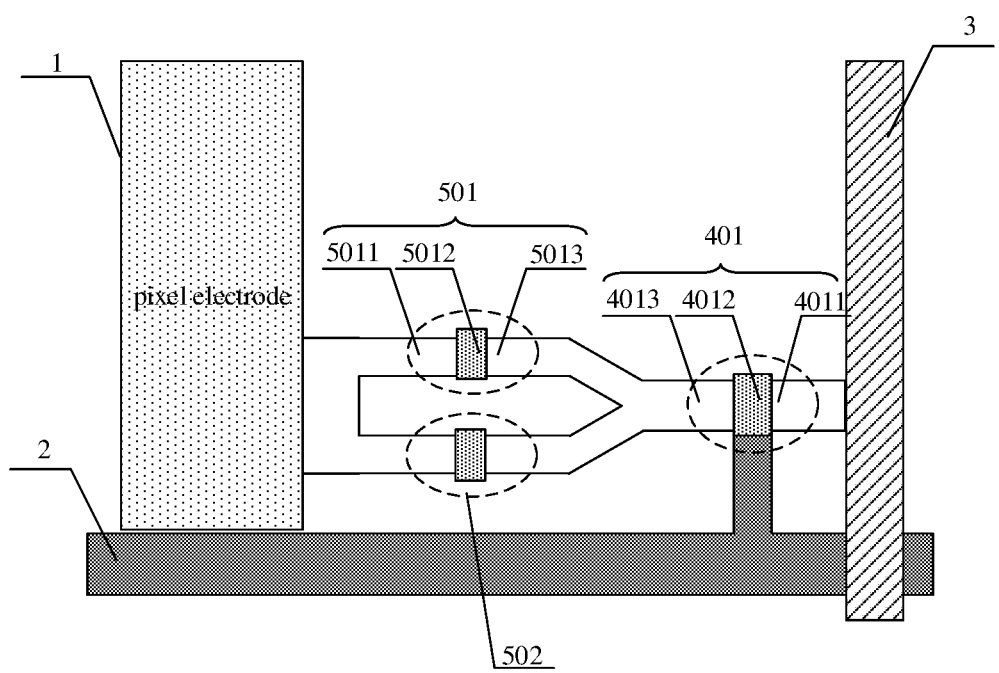
FIG. 3A is a plane schematic diagram of another pixel structure provided by at least one embodiment of the present disclosure.
Figure 3B:
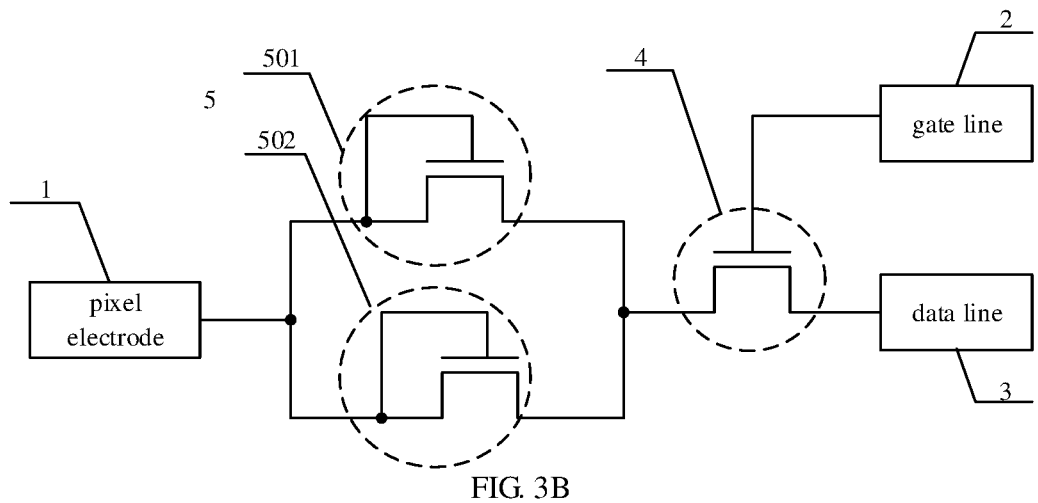
FIG. 3B is an equivalent circuit diagram of the pixel structure illustrated in FIG. 3A.
Figure 3C:
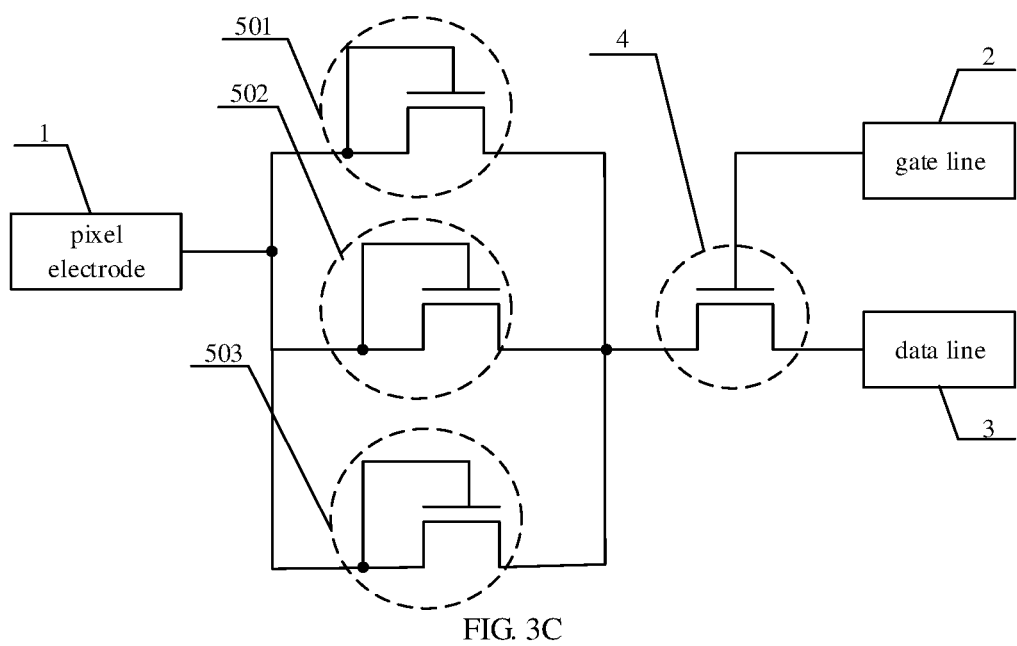
FIG. 3C is another equivalent circuit diagram of the pixel structure provided by at least one embodiment of the present disclosure.

For example, the amount of the first thin film transistors is 1, and the amount of the second thin film transistors is more than 1. For example, FIG. 3. A is a plane schematic diagram of another pixel structure provided by at least one embodiment of the present disclosure, FIG. 3B is an equivalent circuit diagram of the pixel structure illustrated in FIG. 3A, and FIG. 3C is another equivalent circuit diagram of the pixel structure provided by at least one embodiment of the present disclosure. The pixel structure illustrated in FIG. 3A to FIG. 3C differs from the pixel structure illustrated in FIG. 2A in that the pixel structure includes a plurality of the second thin film transistors. Referring to FIG. 3A and FIG. 3B, the pixel structure 10 includes one first thin film transistor 401 and two second thin film transistors 501/502. The structure of the first thin film transistor 401, the structure of each second thin film transistor 501/502, and a connection relationship between the first thin film transistor 401 and each second thin film transistor are same as those illustrated in FIG. 2A and FIG. 2B, therefore the two second thin film transistors 501/502 are connected in parallel between the second electrode 4013 of the first thin film transistor and the pixel electrode 1.

For example, in FIG. 3A and FIG. 3B, the reverse breakdown voltages of the two second thin film transistors 501/502 are same with each other, for example, both the reverse breakdown voltages of the two second thin film transistors 501/502 are $V_d$. In this way, the two second thin film transistors 501/502 are turned on or turned off simultaneously. If the gate voltage applied to the gate line 2 is greater than the threshold voltage of the first thin film transistor 401 and the data voltage applied to the data line 3 is greater than the reverse breakdown voltage $V_d$ of the second thin film transistor, both the first thin film transistor 401 and the two second thin film transistors 501/502 are turned on, and the pixel electrode 1 is charged simultaneously by the two second thin film transistors 501/502. Therefore, in the case that the data voltage is high and thus more electric charges are required to be transmitted, the pixel structure 10 provided in FIG. 3A and FIG. 3B improves a charge transmission speed, thus the charging speed is improved and the time for transmitting electrical signals from the data line 3 to the pixel electrode 1 is reduced, thus the degree of delay of the electrical signals is reduced, which is beneficial to reducing or avoiding the display defects such as flickering of the display image seen by human eyes due to the delay of the signal transmission.

For example, in FIG. 3A and FIG. 3B, the reverse breakdown voltages of the two second thin film transistors 501/502 are different, for example, the reverse breakdown voltage of the second thin film transistor 501 is $V_{d1}$, and the reverse breakdown voltage of the second thin film transistor 502 is $V_{d2}$, and $V_{d1} < V_{d2}$. If the first thin film transistor 401 is turned on and if the data voltage is low, for example, the data voltage is greater than $V_{d1}$ and less than $V_{d2}$, the second thin film transistor 501 is turned on but the second thin film transistor 502 is in the off state. At this time, the pixel electrode 1 is charged only by the first thin film transistor 401 and the second thin film transistor 501. In the case that the data voltage is low, the amount of charges that need to be transmitted in the charging process is small, the degree of delay of the electrical signals is low; therefore, in this case, charging the pixel electrode 1 only by the first thin film transistor 401 and the second thin film transistor 501 meets the requirement of the signal transmission speed. If the data voltage is higher, for example, the data voltage is greater than $V_{d2}$, the second thin film transistors 501/502 are all turned on, and the pixel electrode 1 is charged by the two second thin film transistors 501/502, which improves the charging speed, reduces the degree of delay of the electrical signals, and is beneficial to reducing or avoiding display defects such as flickering of the display image seen by human eyes due to the signal transmission delay.

For example, the amount of second thin film transistors is more than 2. For example, the pixel structure includes 3 second thin film transistors. Referring to the equivalent circuit of the pixel structure illustrated in FIG. 3C, similar to the example illustrated in FIG. 2A above, the reverse breakdown voltages of the three second thin film transistors 501/502/503 are the same or different from each other, and the corresponding technical effects as described above are achieved. For example, the reverse breakdown voltages of the second thin film transistors 501/502/503 are set in a manner of equal difference. The reverse breakdown voltage values of the second thin film transistors 501/502/503 are respectively $V_{d1}$, $V_{d2}$, $V_{d3}$, $V_{d1} < V_{d2} < V_{d3}$ and $V_{d2} - V_{d1} = V_{d3} - V_{d2}$, that is, $V_{d1}$, $V_{d2}$, $V_{d3}$ constitute an equal difference arithmetic sequence. In this way, under different data voltages, the amounts of the second thin film transistors which are turned on are different, and the charging speeds are different, so that the charging speed is uniformly controlled grade by grade. Therefore, in the case that the data voltage is high, the requirement of charging speed is satisfied, the degree of delay of the electrical signals is reduced, and the display quality is improved.

For example, the amount of second thin film transistors is more than 3. The above embodiments are only exemplary examples. In the embodiments of the present disclosure, no limitation is imposed to the amount of second thin film transistors connected in parallel between the second electrode of the first thin film transistor and the pixel electrode.

In at least one embodiment of the present disclosure, the amount of the second thin film transistors is more than or equal to 3, and the reverse breakdown voltages of the plurality of second thin film transistors are set in the manner of equal difference. For example, the pixel structure includes n second thin film transistors, where n is an integer more than or equal to 3. The reverse breakdown voltages of at least two second thin film transistors of the n second thin film transistors are different from each other, so that the charging speed of the pixel electrode 1 is controlled grade by grade. For example, all the reverse breakdown voltages of the n second thin film transistors are different from each other, so as to realize more regulation grades for the charging speed of the pixel electrode 1. For example, the reverse breakdown voltages of the n second thin film transistors are distributed in the manner of equal difference. For example, the reverse breakdown voltages of the n second thin film transistors are respectively $V_{d1}$, $V_{d2}$, $V_{d3}$ ... $V_{d(n-1)}$, $V_{dn}$ from small to large. $V_{d1}$, $V_{d2}$, $V_{d3}$ ... $V_{dn}$ form the equal difference arithmetic sequence, that is, $V_{dn}-V_{d(n-1)}=V_{d(n-1)}-V_{d(n-2)}$ ... $=V_{d2}-V_{d1}$. For example, as the reverse breakdown voltage of the second thin film transistor increases, the difference between the reverse breakdown voltages of every two second thin film transistors decreases. That is, $V_{dn}-V_{d(n-1)}<V_{d(n-1)}-V_{d(n-2)}$ ... $<V_{d2}-V_{d1}$. In this way, as the data voltage increases, the amount of the second thin film transistors that are turned on is increased, which is beneficial to better meeting the charging speed requirements at the high data voltage and reducing the degree of delay of the electrical signals from the data lines, thus the display quality is improved.

Under a same material and a same thickness of the channel region of a thin film transistor, the reverse breakdown voltage of the thin film transistor is positively correlated with the channel region area. For example, in the above embodiments, the channel region areas of the plurality of second thin film transistors are the same so that the reverse breakdown voltages of the plurality of second thin film transistors are same; or, the channel region areas of at least two of the plurality of second thin film transistors are different from each other so that the reverse breakdown voltages of the at least two second thin film transistors are different from each other. For example, in the case where the reverse breakdown voltages of the plurality of second thin film transistors are different from each other, the channel region areas of the plurality of second thin film transistors are different from each other. It should be noted that no limitation is imposed to a size of the channel region area and a value of the reverse breakdown voltage in the embodiments of the present disclosure, and those skilled in the art may design according to needs.

Figure 4A:
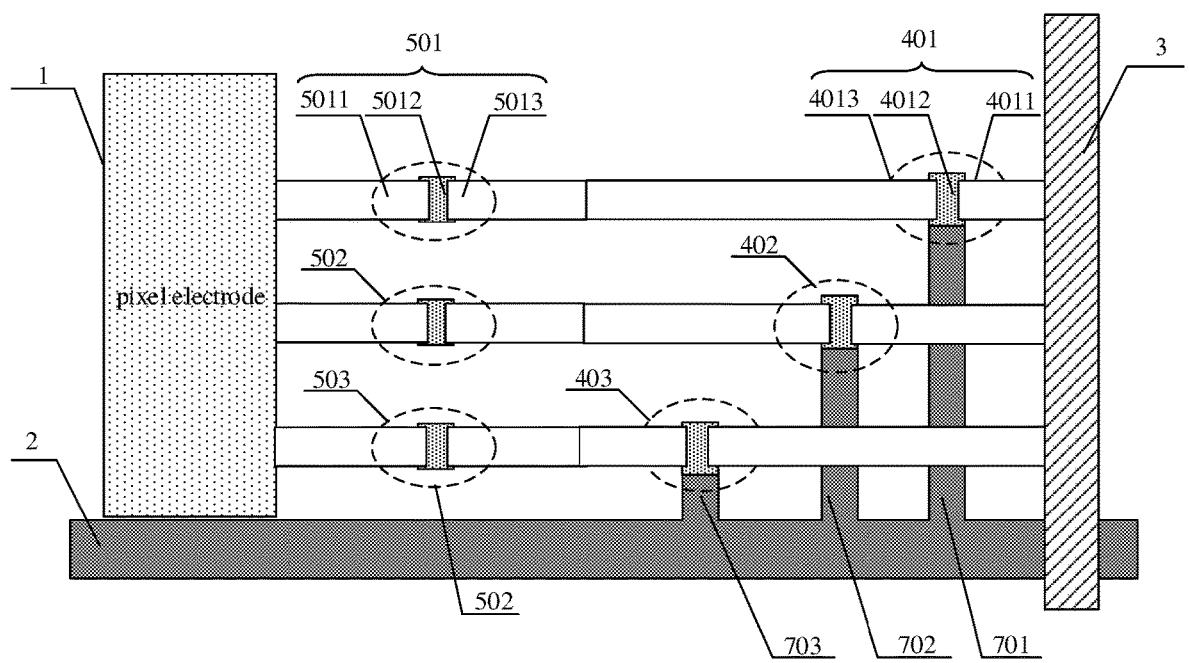
FIG. 4A is a plane schematic diagram of further another pixel structure provided by at least one embodiment of the present disclosure.
Figure 4B:
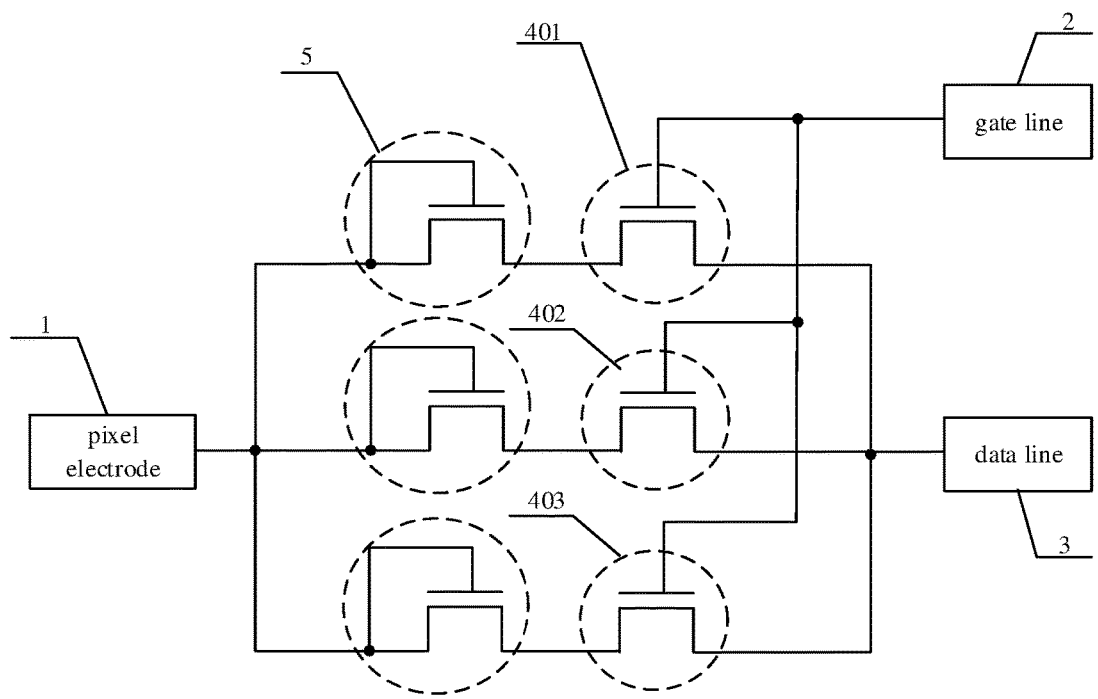
FIG. 4B is an equivalent circuit diagram of the pixel structure illustrated in FIG. 4A.

For example, the amount of the first thin film transistors is more than 1, and the amount of the second thin film transistors is more than 1. For example, FIG. 4A is a plane schematic diagram of further another pixel structure provided by at least one embodiment of the present disclosure, FIG. 4B is an equivalent circuit diagram of the pixel structure illustrated in FIG. 4A. The pixel structure 10 illustrated in FIG. 4A includes three first thin film transistors 401/402/403, and the amount of second thin film transistor connected with each of the first thin film transistors is 1, so that the total amount of the second thin film transistors is also 3. For example, the second thin film transistor 501 is connected with the first thin film transistor 401, the second thin film transistor 502 is connected with the first thin film transistor 402, and the second thin film transistor 503 is connected with the first thin film transistor 403. The connection mode of each of the first thin film transistors and the second thin film transistor connected thereto is the same as that in the above embodiments and thus may be referred to the above description. For example, the threshold voltages of the first thin film transistors 401/402/403 are same with each other, so that the first thin film transistors 401/402/403 are turned on simultaneously or turned off simultaneously. For example, the reverse breakdown voltages of the second thin film transistors 501/502/503 are the same with each other or different from each other. The case where the reverse breakdown voltages of the plurality of second thin film transistors are same with each other and the case where the reverse breakdown voltages of the plurality of second thin film transistors are different from each other are the same as those in the above embodiments and thus may be referred to the previous description. The pixel structure in this embodiment achieves the same or similar technical effects as the above embodiments which are not repeated herein. It should be noted that the amount of the first thin film transistor and the amount of the second thin film transistor are not limited to those illustrated in FIG. 4A.

Figure 5A:
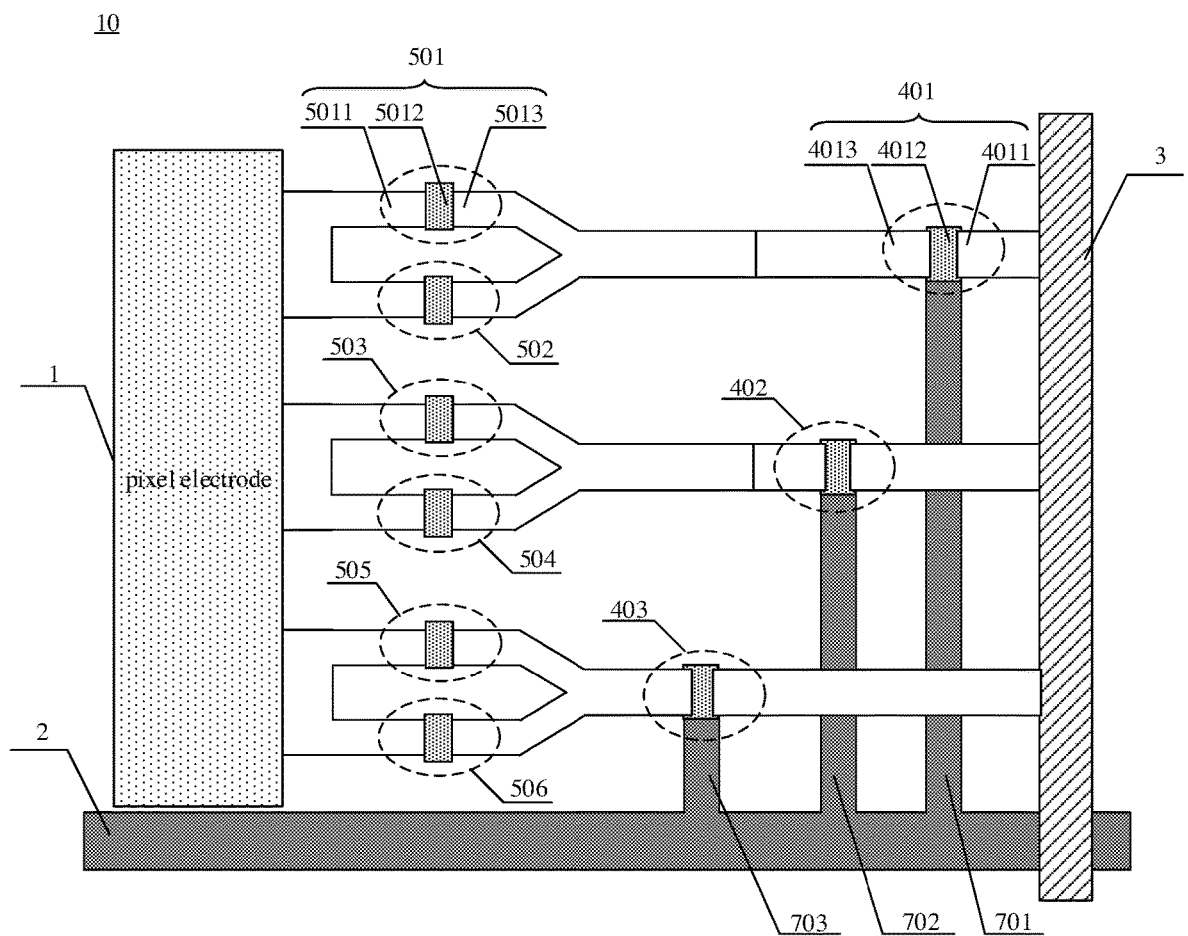
FIG. 5A is a plane schematic diagram of further another pixel structure provided by at least one embodiment of the present disclosure.
Figure 5B:
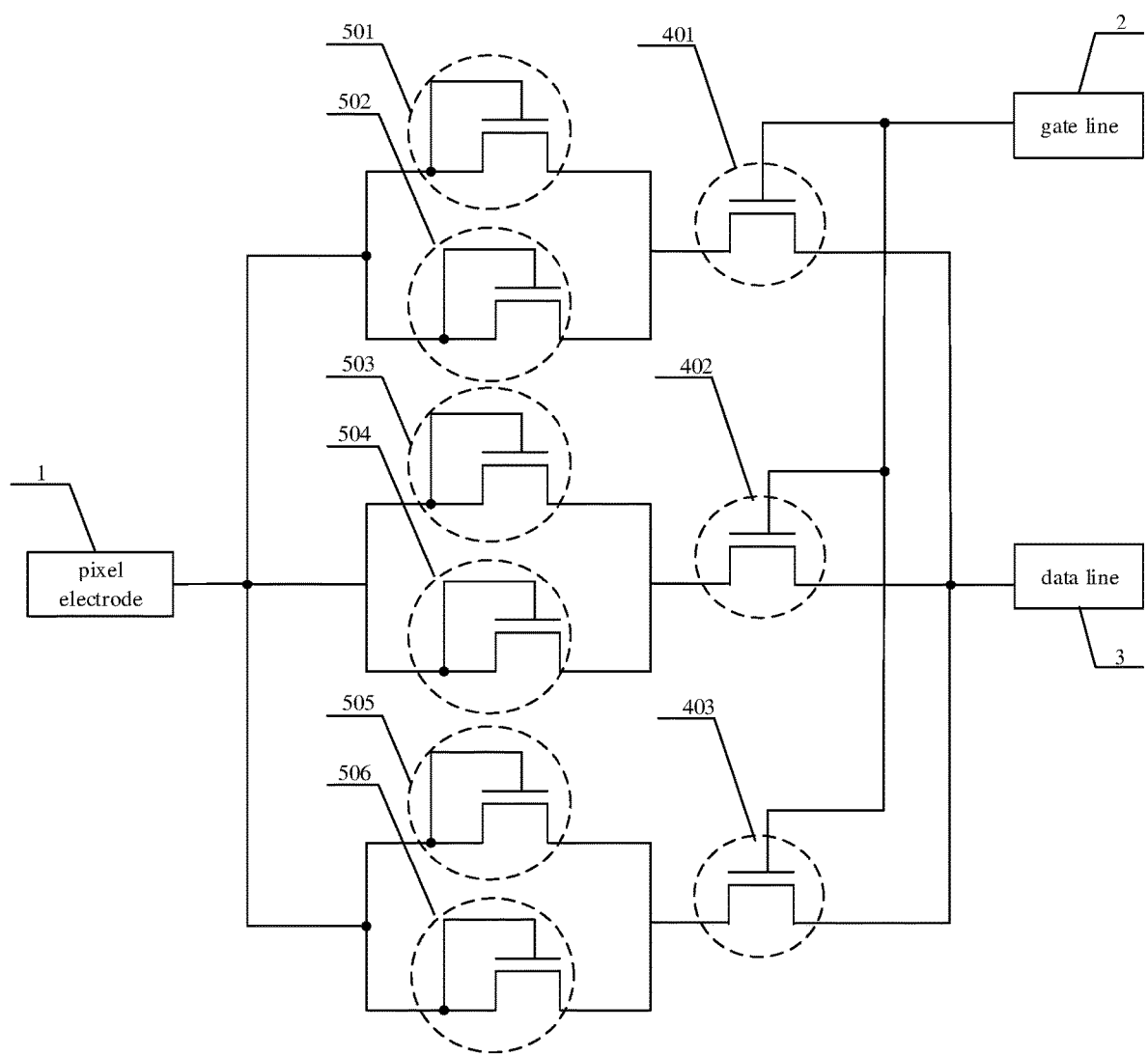
FIG. 5B is an equivalent circuit diagram of the pixel structure illustrated in FIG. 5A.

For example, the amount of the first thin film transistors is more than 1, and the amount of the second thin film transistors connected with each of the first thin film transistors is more than 1. For example, FIG. 5A is a plane schematic diagram of further another pixel structure provided by at least one embodiment of the present disclosure, and FIG. 5B is an equivalent circuit diagram of the pixel structure illustrated in FIG. 5A. The pixel structure 10 illustrated in FIG. 5A includes three first thin film transistors 401/402/403, and the amount of the second thin film transistors connected with each of the first thin film transistors is 2. For example, the second thin film transistors 501/502 are respectively connected with the first thin film transistor 401, the second thin film transistors 503/504 respectively are connected with the first thin film transistor 402, and the second thin film transistors 505/506 respectively are connected with the first thin film transistor 403. For example, the gate electrodes of the first thin film transistors 401/402/403 are electrically connected with the gate line 2 respectively by gate line leads 701/702/703. The connection mode of each first thin film transistor and the second thin film transistor connected thereto is the same as that in the above embodiments and thus may be referred to the above description. As illustrated in FIG. 5B, the first thin film transistors 401/402/403 are connected in parallel, the second thin film transistors 501/502 are connected in parallel between the second electrode of the first thin film transistor 401 and the pixel electrode 1, the second thin film transistors 503/504 are connected in parallel between the second electrode of the first thin film transistor 402 and the pixel electrode 1, and the second thin film transistors 505/506 are connected in parallel between the second electrode of the first thin film transistor 403 and the pixel electrode 1. Similarly, the reverse breakdown voltages of the second thin film transistors 501/502/503/504/505/506 are the same with each other or different from each other. The case where the reverse breakdown voltages of the plurality of second thin film transistors are same with each other and the case where the reverse breakdown voltages of the plurality of second thin film transistors are different from each other are the same as those in the above embodiments and thus may be referred to the previous description. The pixel structure in this embodiment achieves the same or similar technical effects as the above embodiments which are not repeated herein. It should be noted that the amount of the first thin film transistor is not limited to those illustrated in FIG. 5A, and the amount of the second thin film transistors connected with each of the first thin film transistors is not limited to those illustrated in FIG. 5A.

Figure 6A:
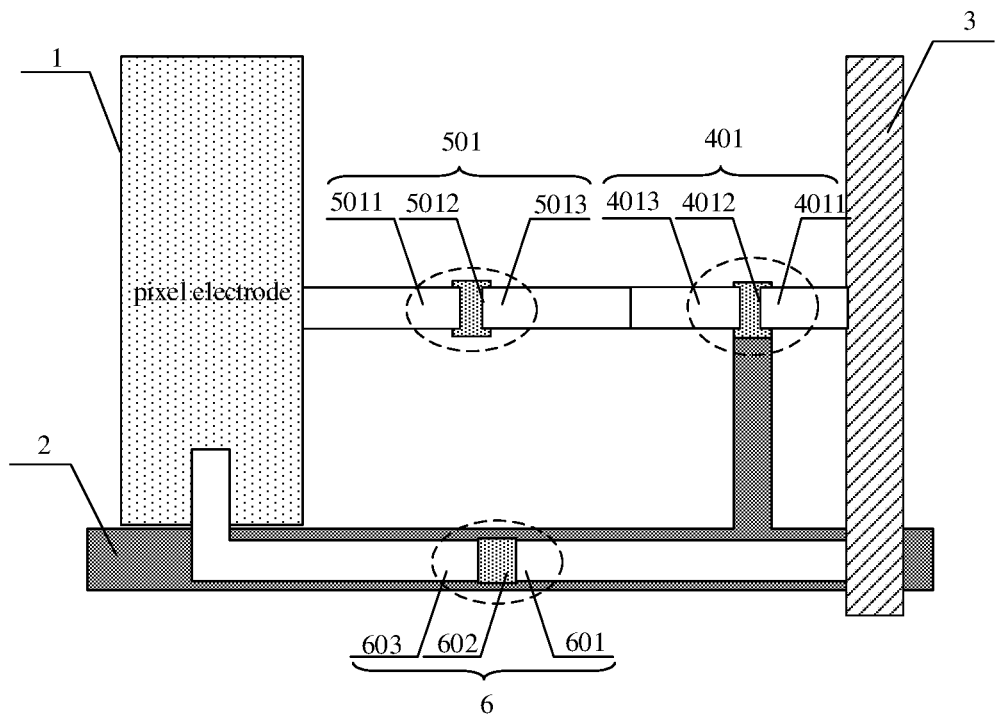
FIG. 6A is a plane schematic diagram of further another pixel structure provided by at least one embodiment of the present disclosure.
Figure 6B:
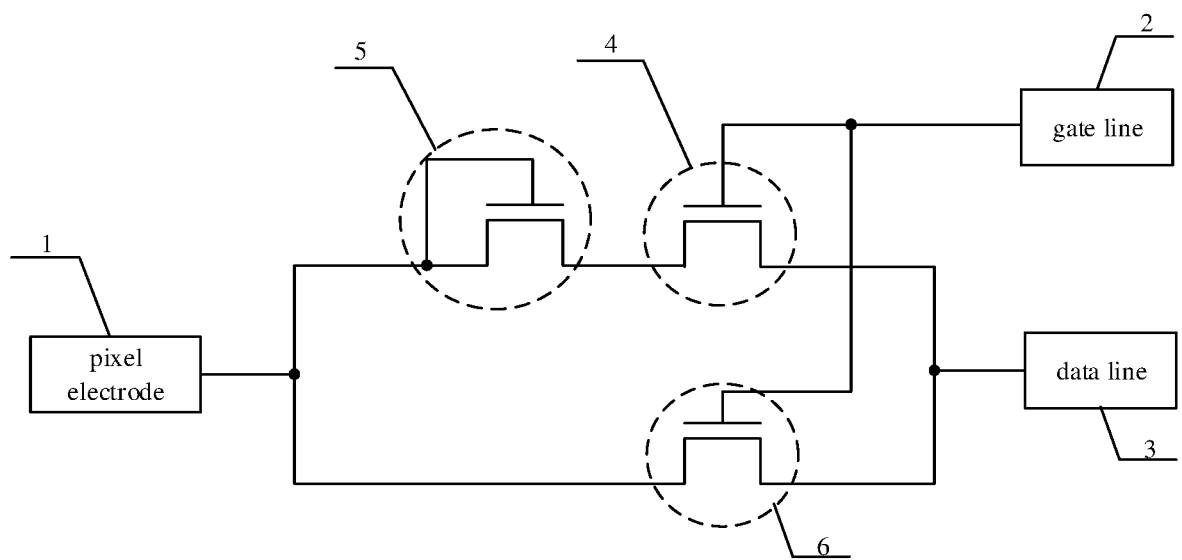
FIG. 6B is an equivalent circuit diagram of the pixel structure illustrated in FIG. 6A.

FIG. 6A is a plane schematic diagram of further another pixel structure provided by at least one embodiment of the present disclosure, and FIG. 6B is an equivalent circuit diagram of the pixel structure illustrated in FIG. 6A. As illustrated in FIG. 6A and FIG. 6B, the pixel structure 10 further comprises a third thin film transistor 6, and the third thin film transistor 6 comprises a gate electrode 602, a first electrode 601 and a second electrode 603; the gate electrode 602 of the third thin film transistor 6 is electrically connected with the gate line 2, the first electrode 601 of the third thin film transistor 6 is electrically connected with the data line 3, and the second electrode 603 of the third thin film transistor 6 is electrically connected with the pixel electrode 1. Other structures of the pixel structure 10 are the same as those illustrated in FIG. 2A. The third thin film transistor 6 has a threshold voltage, and if the gate voltage applied to the gate line 2 is greater than the threshold voltage of the third thin film transistor 6, the third thin film transistor 6 is turned on, so that the pixel electrode 101 is charged by the third thin film transistor 6.

For example, the threshold voltage of the first thin film transistor 401 is less than or equal to the threshold voltage of the third thin film transistor 6. If the gate voltage applied to the gate line 2 is greater than the threshold voltage of the third thin film transistor 6, the third thin film transistor 6 is turned on, thus the pixel electrode 101 is charged by the third thin film transistor 6; and at this time, the gate voltage applied to the gate line 2 is also greater than the threshold voltage of the first thin film transistor 401, and the first thin film transistor 401 is turned on. If the data voltage applied to the data line 3 is low, for example, the data voltage is smaller than the reverse breakdown voltage of the second thin film transistor 501, the second thin film transistor 501 is in the off state, and the pixel electrode 101 is charged only by the third thin film transistor 6; if the data voltage applied to the data line 3 is high, for example, the data voltage is greater than the reverse breakdown voltage of the second thin film transistor 501, the second thin film transistor 501 is turned on, thus the pixel electrode 101 is charged simultaneously by the first thin film transistor 401 and the second thin film transistor 501, as well as the third thin film transistor 6. In this way, in the case that the data voltage is low, a display of a plurality of gray scales is realized, and in the case that the data voltage is high, the second thin film transistor 501 is turned on so that the pixel electrode is simultaneously charged by the third thin film transistor, as well as the first thin film transistor and the second thin film transistor 501 to improve the charging speed, reduce the degree of delay of the electric signals from the data line, thus the display quality is improved.

For example, in at least one embodiment of the present disclosure, the threshold voltage of the first thin film transistor 401 is greater than the threshold voltage of the third thin film transistor 6.

Figure 7A:
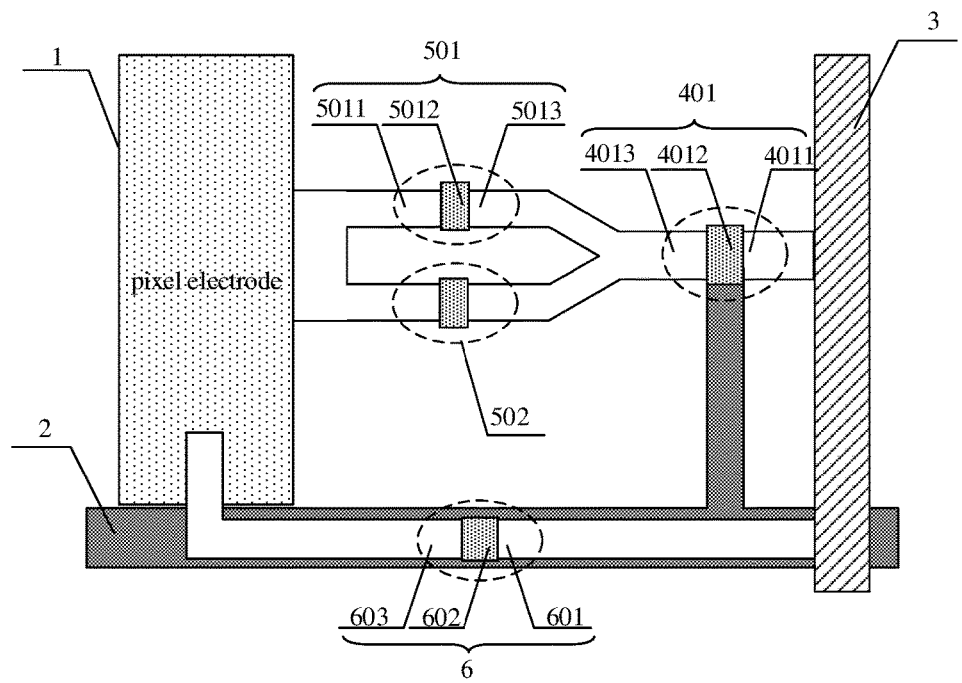
FIG. 7A is a plane schematic diagram of further another pixel structure provided by at least one embodiment of the present disclosure.
Figure 7B:
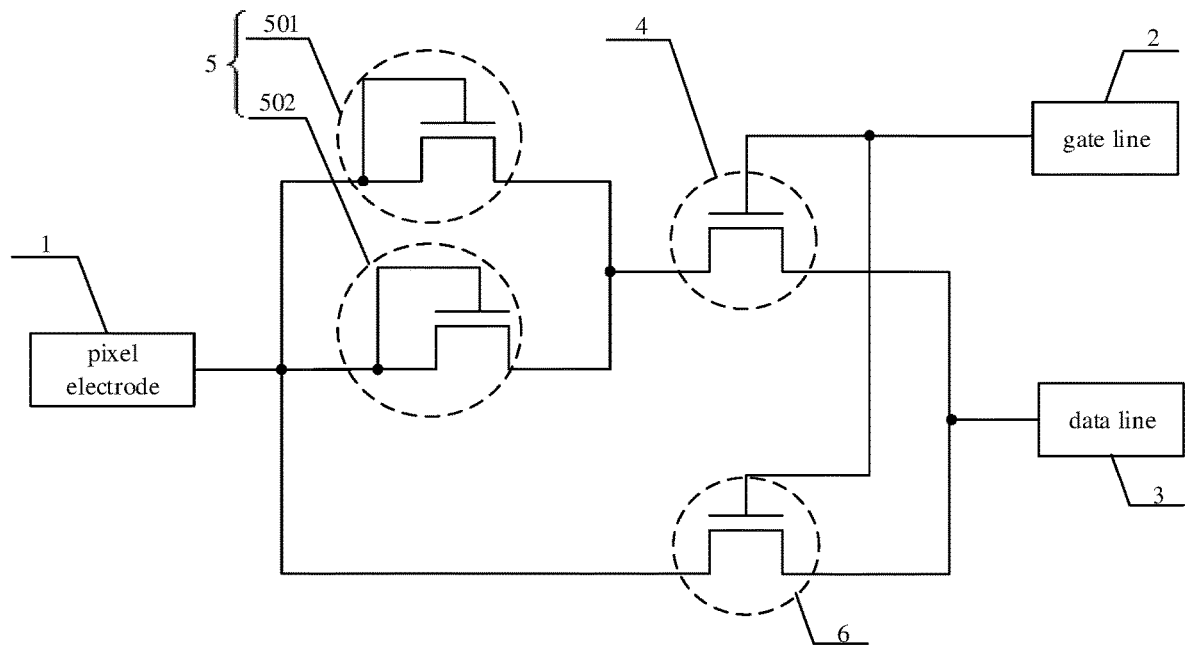
FIG. 7B is an equivalent circuit diagram of the pixel structure illustrated in FIG. 7A.
Figure 7C:
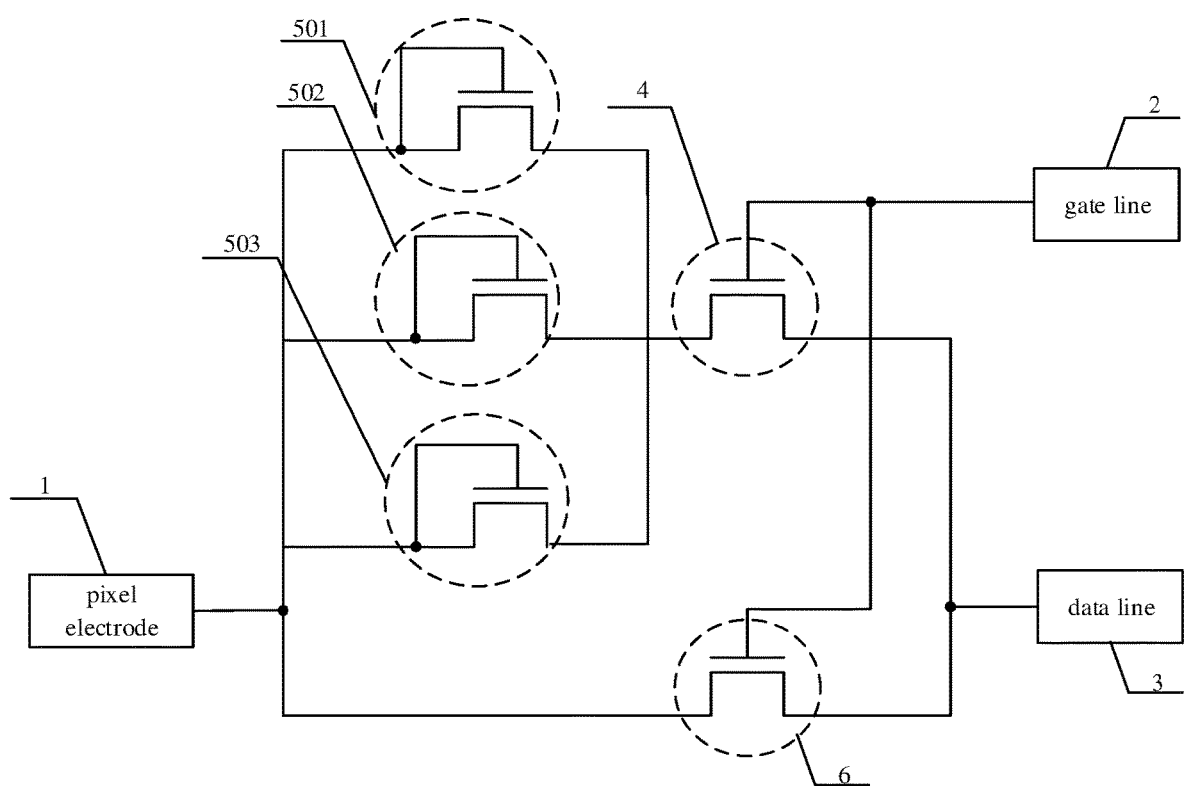
FIG. 7C is another equivalent circuit diagram of the pixel structure provided by at least one embodiment of the present disclosure.
Figure 8A:
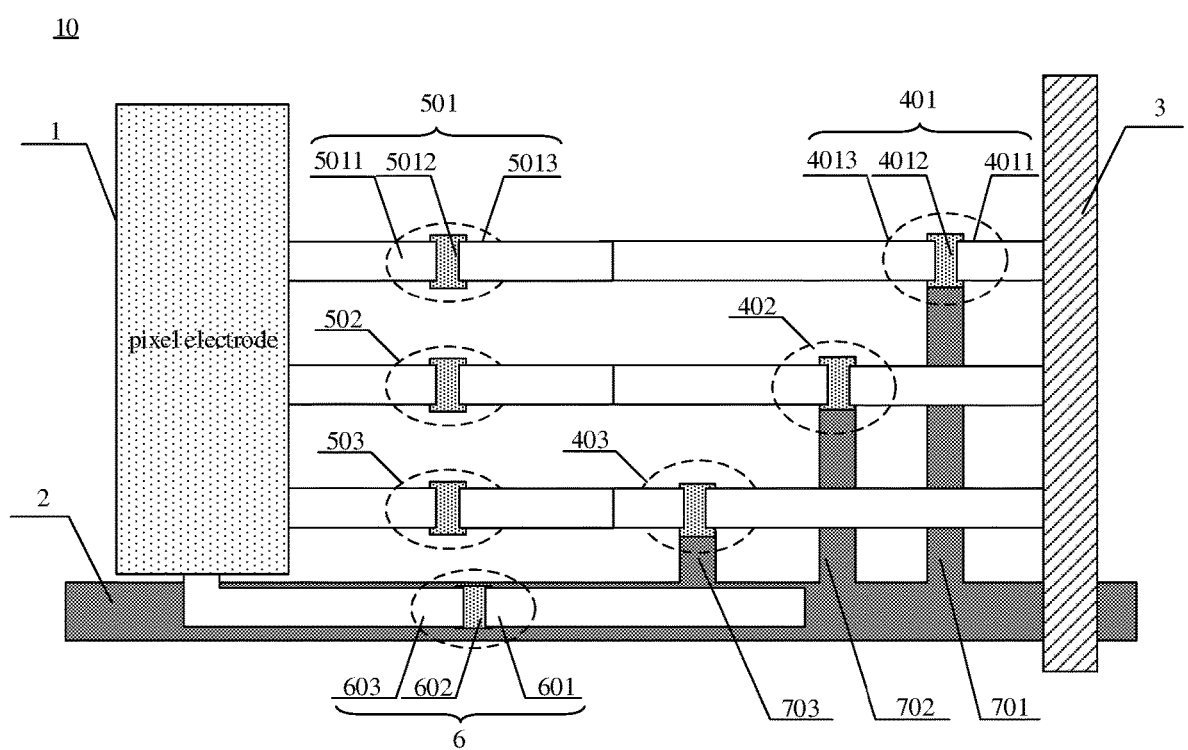
FIG. 8A is a plane schematic diagram of further another pixel structure provided by at least one embodiment of the present disclosure.
Figure 8B:
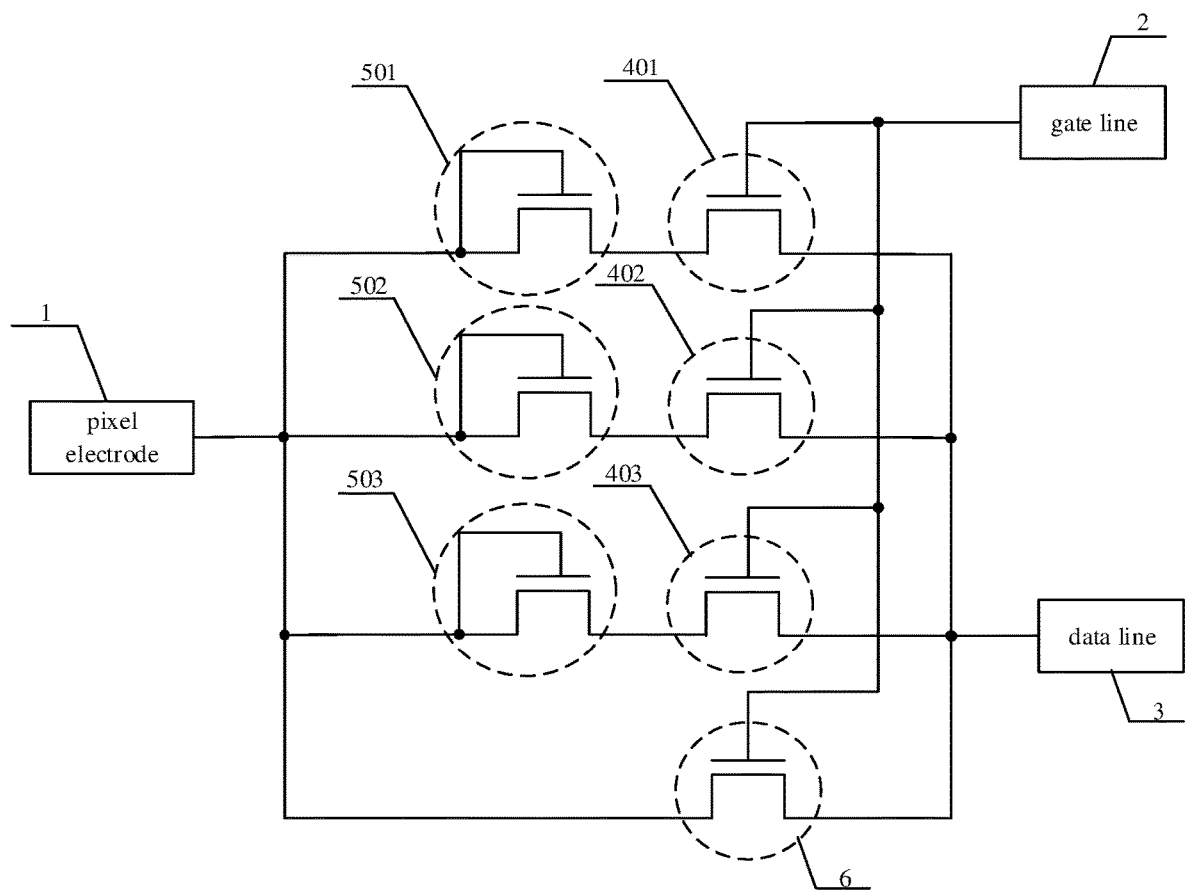
FIG. 8B is an equivalent circuit diagram of the pixel structure illustrated in FIG. 8A.
Figure 9A:
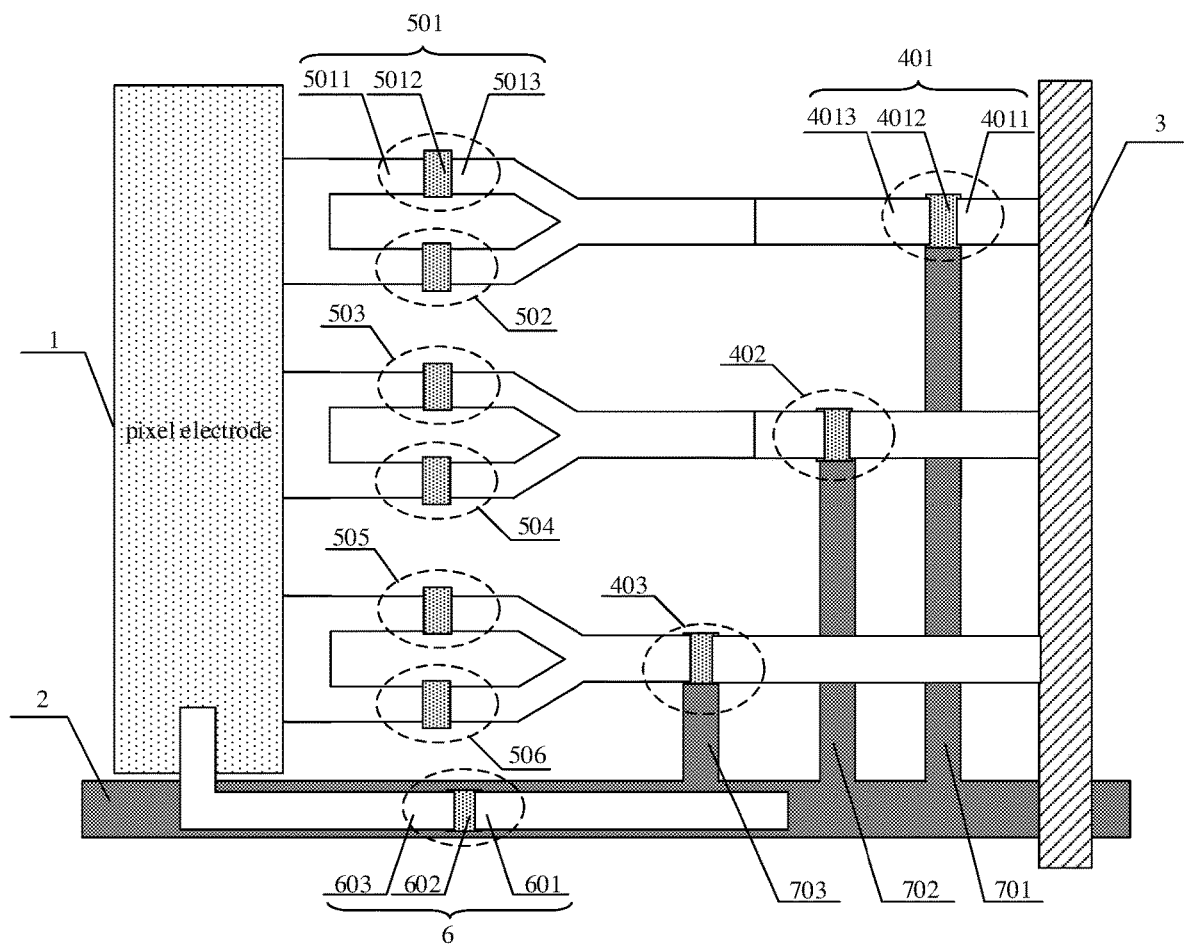
FIG. 9A is a plane schematic diagram of further another pixel structure provided by at least one embodiment of the present disclosure.
Figure 9B:
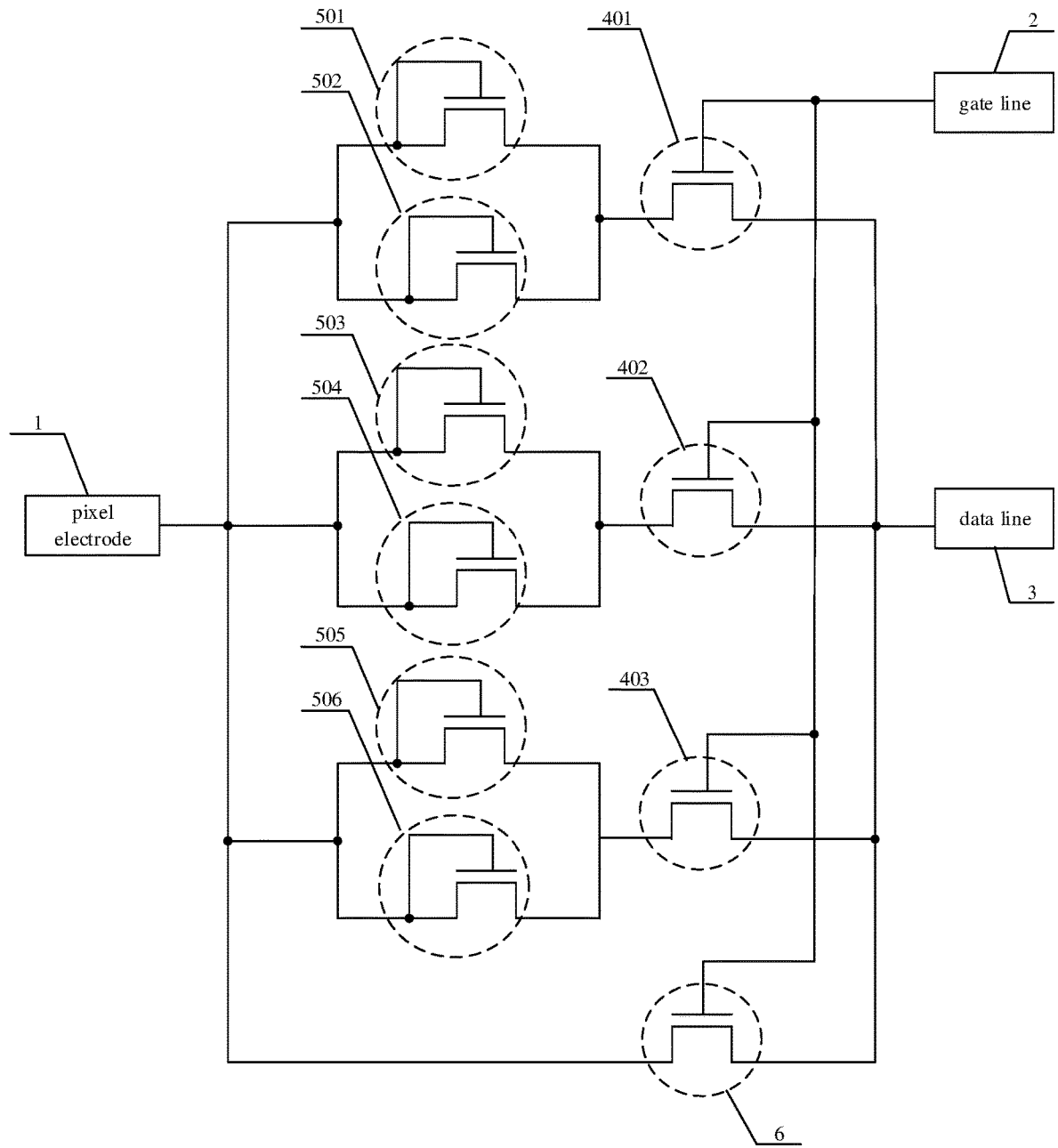
FIG. 9B is an equivalent circuit diagram of the pixel structure illustrated in FIG. 9A.

FIG. 7A is a plane schematic diagram of further another pixel structure provided by at least one embodiment of the present disclosure, FIG. 7B is an equivalent circuit diagram of the pixel structure illustrated in FIG. 7A, FIG. 7C is another equivalent circuit diagram of the pixel structure provided by at least one embodiment of the present disclosure, FIG. 8A is a plane schematic diagram of further another pixel structure provided by at least one embodiment of the present disclosure, FIG. 8B is an equivalent circuit diagram of the pixel structure illustrated in FIG. 8A, FIG. 9A is a plane schematic diagram of further another pixel structure provided by at least one embodiment of the present disclosure, and FIG. 9B is an equivalent circuit diagram of the pixel structure illustrated in FIG. 9A. The example illustrated in FIG. 7A-FIG. 7C differs from the example illustrated in FIG. 6A in that the amount of the second thin film transistors connected to the first thin film transistor 401 is more than 1. For example, in the pixel structure illustrated in FIG. 7A and FIG. 7B, the amount of the second thin film transistors connected to the first thin film transistor 401 is two, and in the pixel structure illustrated in FIG. 7C, the amount of the second thin film transistors connected to the first thin film transistor 401 is three. Of course, the amount of the second thin film transistors connected to the first thin film transistor 401 is not limited to 2 or 3.

The example illustrated in FIG. 8A and FIG. 8B differs from the example illustrated in FIG. 6A in that the amount of the first thin film transistors is more than 1 and the amount of the second thin film transistor connected to each of the first thin film transistors is 1.

The example illustrated in FIGS. 9A and 9B differs from the example illustrated in FIG. 6A in that the amount of the first thin film transistors is more than 1 and the amount of the second thin film transistors connected to each of the first thin film transistors is more than 1. For example, in FIG. 9A, the amount of the first thin film transistors is 3, and the amount of second thin film transistors connected to each of the first thin film transistor is 2. Of course, the amount of the first thin film transistors is not limited to 3, and the amount of the second thin film transistors connected to each of the first thin film transistor is not limited to 2.

In the embodiments illustrated in FIG. 7A-FIG. 9B, the characteristics of the first thin film transistor and the second thin film transistor are the same as those of the embodiments illustrated in FIG. 3A-FIG. 5B and the same or similar technical effects are achieved, these may be referred to the description in the above embodiments and are not repeated herein. The pixel structure illustrated in FIG. 7A-FIG. 9B achieves the display of the plurality of gray scales in the case that the data voltage is low; and in the case that the data voltage is high, the amount of the second thin film transistors that are turned on is controlled under different data voltages to charge the pixel electrode simultaneously by the third thin film transistor, as well as the first thin film transistor and the second thin film transistor, thus the charging speed is improved, the degree of delay of the electrical signals from the data lines is reduced, and the display quality is improved.

Figure 10:
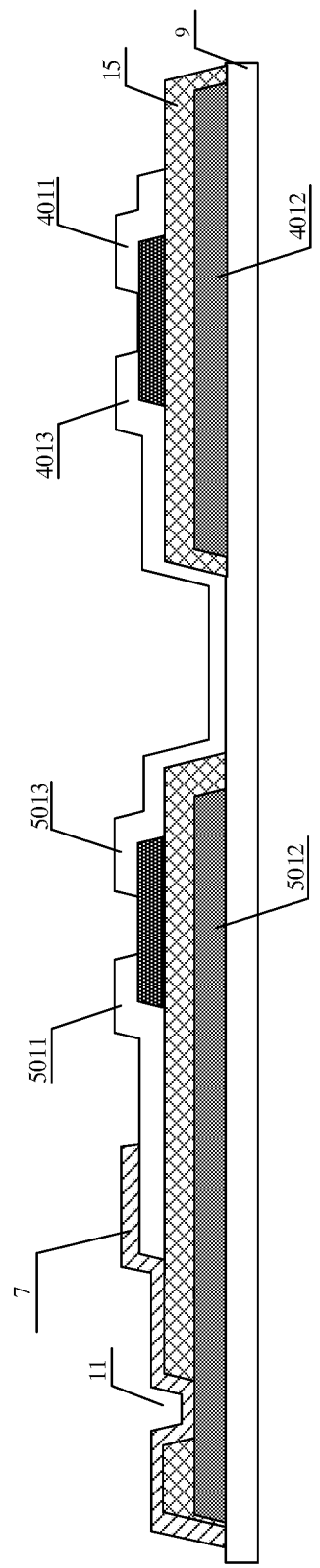
FIG. 10 is a cross-sectional schematic diagram along a line I-I' illustrated in FIG. 2A.

FIG. 10 is a cross-sectional schematic diagram along a line I-I' illustrated in FIG. 2A. As illustrated in FIG. 10, the gate electrode 5012 of the second thin film transistor is on a substrate 9, and a gate insulation layer 15 is on the gate electrode 5012 of the second thin film transistor, and the gate insulation layer 15 includes a via hole 11. For example, the first electrode 5011 of the second thin film transistor on the gate insulation layer 15 is electrically connected with the gate electrode 5012 of the second thin film transistor by a conductive layer 7. A first end, which is away from the first electrode 5011 of the second thin film transistor, of the conductive layer 7 is electrically connected with the gate electrode 5012 of the second thin film transistor by the via hole 11, and a second end, which is close to the first electrode 5011 of the second thin film transistor, of the conductive layer 7 is electrically connected with the first electrode 5011 of the second thin film transistor for example by directly overlapping and in contact with each other, so that the first electrode 5011 of the second thin film transistor is electrically connected to the gate electrode 5012 of the second thin film transistor. For example, the conductive layer 7 is not provided, and the first electrode 5011 of the second thin film transistor extends into the via hole 11 and directly contacts the gate electrode 5012 of the second thin film transistor to realize the electrical connection of the first electrode 5011 of the second thin film transistor and the gate electrode 5012 of the second thin film transistor.

It should be noted that in FIG. 10, the thin film transistor is of the bottom gate type. However, embodiments of the present disclosure are not limited this, and the thin film transistor may be of any type.

For example, the first electrode in the present disclosure is a source electrode of the thin film transistor and the second electrode is a drain electrode of the thin film transistor; alternatively, the first electrode is the drain electrode of the thin film transistor and the second electrode is the source electrode of the thin film transistor. Materials of the first electrode, the second electrode, and the conductive layer of each of the thin film transistors are conductive materials, for example, metal materials (for example, copper, aluminum, copper alloy, aluminum alloy, etc.) or transparent conductive materials (for example, indium tin oxide (ITO), indium zinc oxide (IZO), etc.).

At least one embodiment of the present disclosure further provides a display panel which comprises the pixel structure provided by at least one embodiment of the present disclosure.

Figure 11:
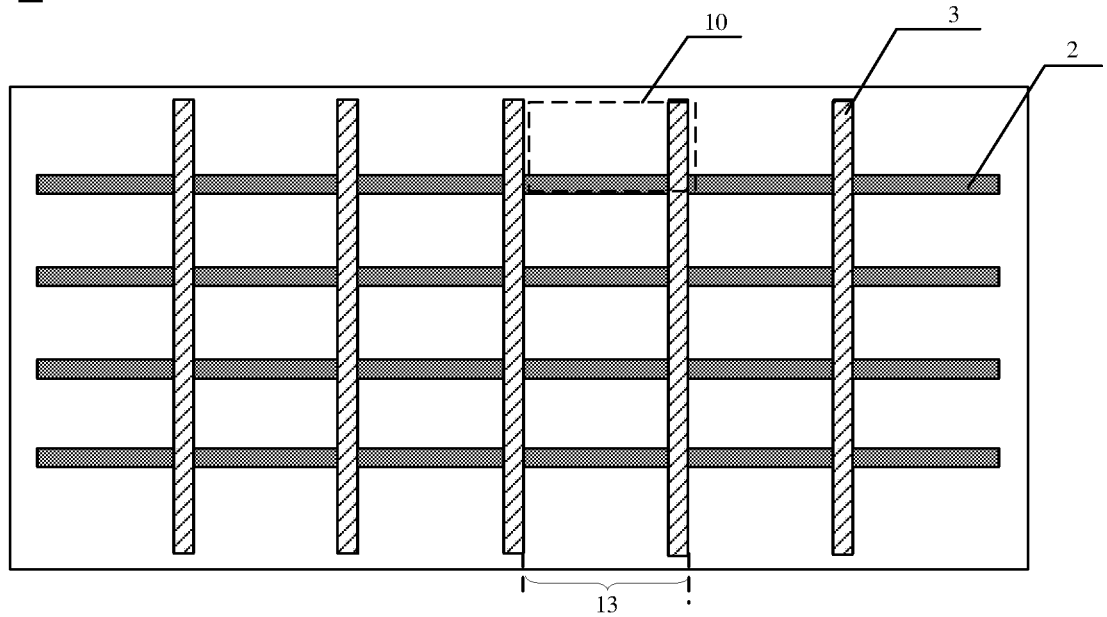
FIG. 11 is a schematic diagram of a display panel provided by at least one embodiment of the present disclosure.

FIG. 11 is a schematic diagram of the display panel provided by at least one embodiment of the present disclosure. As illustrated in FIG. 11, the display panel 12 provided by at least one embodiment of the present disclosure includes any pixel structure provided by the embodiments of the present disclosure. For example, as illustrated in FIG. 11, the display panel 12 includes a plurality of display units 13 surrounded by adjacent gate lines 2 and adjacent data lines, and each of the plurality of display units 13 includes the pixel structure. No limitation is imposed to other structures of the display panel in the embodiments, and other structures of the display panel may be referred to conventional designs in the art. For example, the display panel is a liquid crystal display panel, an organic light emitting display panel, or the like.

At least one embodiment of the present disclosure further provides a display device which comprises the display panel provided by at least one embodiment of the present disclosure.

Figure 12:
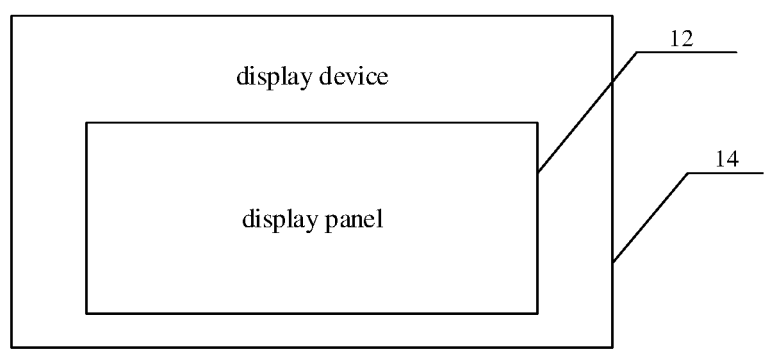
FIG. 12 is a schematic diagram of a display device provided by at least one embodiment of the present disclosure.

FIG. 12 is a schematic diagram of the display device provided by at least one embodiment of the present disclosure. As illustrated in FIG. 12, the display device 14 includes the display panel 12 provided by at least one embodiment of the present disclosure. No limitation is imposed to other structures of the display device 14 in the embodiments, other structures of the display device may be referred to conventional designs in the art.

For example, the display device 14 is a product or a component having a display function such as a mobile phone, a tablet computer, a television, a display, a notebook computer, a digital photo frame, a navigator, etc.

At least one embodiment of the present disclosure further provides a driving method of the pixel structure, and the driving method is applicable to the pixel structure provided by at least one embodiment of the present disclosure. The driving method comprises: applying a gate voltage to the gate line, and applying a data voltage to the data line, and controlling the gate voltage to be greater than or equal to a threshold voltage of the first thin film transistor and the data voltage to be greater than or equal to a reverse breakdown voltage of the second thin film transistor so that the pixel electrode is charged by the first thin film transistor and the second thin film transistor.

For example, for the pixel structure illustrated in FIG. 2A, during an operation of the pixel structure, the gate voltage is applied to the gate line 2 and the data voltage is applied to the data line 3. The first thin film transistor 401 is controlled to be turned on or turned off by controlling the value of the gate voltage. If the first thin film transistor 401 is turned on, the second thin film transistor 501 is controlled to be turned on or turned off by controlling the value of the data voltage. For example, the gate voltage is controlled to be greater than or equal to the threshold voltage of the first thin film transistor 401, and the data voltage is controlled to be greater than or equal to the reverse breakdown voltage of the second thin film transistor 501, so that both the first thin film transistor 401 and the second thin film transistor 501 are turned on, the pixel electrode 1 is charged by the first thin film transistor 401 and the second thin film transistor 501.

For example, the gate voltage is smaller than the threshold voltage of the first thin film transistor 401, and the first thin film transistor 401 is in the off state; at this time, the pixel electrode 1 is not charged by the first thin film transistor 401 and the second thin film transistor. For example, the gate voltage is greater than or equal to the threshold voltage of the first thin film transistor 401 but the data voltage is less than the reverse breakdown voltage of the second thin film transistor 501; at this time, although the first thin film transistor 401 is turned on, the second thin film transistor 501 is in the off state, thus the first thin film transistor 401 and the second thin film transistor 501 do not form a conduction path so that the pixel electrode 1 is not charged by the first thin film transistor 401 and the second thin film transistor 501; at this time, the pixel electrode 1 is not charged, and the pixel unit where the pixel electrode 1 is located is in a non-display state. The pixel electrode 1 being charged by the first thin film transistor 401 and the second thin film transistor 402 refers to that the charging process of the pixel electrode 1 is controlled by both the first thin film transistor 401 and the second thin film transistor 402, so that the charging process of the pixel electrode 1 is more stable and reliable.

For example, for the embodiments of the pixel structure illustrated in FIG. 3A-FIG. 5B, the pixel structure includes a plurality of second thin film transistors, and the reverse breakdown voltages of the plurality of second thin film transistors for example are different from each other. The higher the data voltage is, the more the second thin film transistors are turned on, and the faster the pixel electrode is charged. In this way, the pixel electrode is charged simultaneously by the plurality of second thin film transistors under the high data voltage, so that the charging speed is improved, the degree of delay of the electric signals from the data line is reduced, and the display quality is improved.

For example, for the embodiments of the pixel structure illustrated in FIG. 6A-FIG. 9B, the pixel structure further comprises the third thin film transistor, and the third thin film transistor comprises the gate electrode, the first electrode and the second electrode. The gate electrode of the third thin film transistor is electrically connected with the gate line, the first electrode of the third thin film transistor is electrically connected with the data line, and the second electrode of the third thin film transistor is electrically connected with the pixel electrode. The driving method further comprises: controlling the gate voltage to be greater than or equal to a threshold voltage of the third thin film transistor so that the third thin film transistor is turned on, and the pixel electrode is charged by the third thin film transistor. In this way, the pixel electrode is charged simultaneously by the third thin film transistor, the first thin film transistor and the second thin film transistor.

For example, the driving method further comprises controlling the gate voltage to be greater than or equal to the threshold voltage of the third thin film transistor and the threshold voltage of the first thin film transistor so that the third thin film transistor is turned on and the first thin film crystal are turned on. At this time, in the case that the data voltage is low, for example, the data voltage is less than the reverse breakdown voltage of any one of the second thin film transistors, each of the second thin film transistors is in the off state, the pixel electrode is only charged by the third thin film transistor, and the display gray scale of the pixel unit where the pixel structure is located is controlled by controlling the value of the data voltage, so that the display of a plurality gray scales is realized; in the case that the data voltage is high, the data voltage is controlled to be larger than the reverse breakdown voltage of at least one of the second thin film transistors to turn on the at least one of the second thin film transistors, thus the pixel electrode is charged simultaneously by the third thin film transistor, as well as the first thin film transistor and the second thin film transistor, which improves the charging speed, reduce the degree of delay of the electrical signals from the data lines and improves the display quality.

For example, The driving method further comprises: controlling the gate voltage to be smaller than the threshold voltage of the third thin film transistor so that the third thin film transistor is not turned on and the pixel electrode is not charged by the third thin film transistor. For example, the threshold voltage of the third thin film transistor is greater than the threshold voltage of the first thin film transistor. If the gate voltage applied to the gate line is greater than the threshold voltage of the first thin film transistor and less than the threshold voltage of the third thin film transistor, the first thin film transistor is turned on and the third thin film transistor is not turned on; at this time, if the data voltage is controlled so that at least one of the second thin film transistors is turned on, the pixel electrode is charged only by the first thin film transistor and the second thin film transistor. For example, if the gate voltage applied to the gate line is less than the threshold voltage of the first thin film transistor and less than the threshold voltage of the third thin film transistor, the pixel electrode is not charged and the pixel unit where the pixel electrode is located is in the non-display state.

What have been described above are only specific implementations of the present disclosure, the protection scope of the present disclosure is not limited thereto. The protection scope of the present disclosure should be based on the protection scope of the claims.

What is claimed is:

1. A pixel structure, comprising:
   a pixel electrode, a gate line and a data line;
   a first thin film transistor comprising a gate electrode, a first electrode and a second electrode;
   a second thin film transistor comprising a gate electrode, a first electrode and a second electrode;
   wherein the gate electrode of the first thin film transistor is electrically connected with the gate line, the first electrode of the first thin film transistor is electrically connected with the data line;
   the gate electrode of the second thin film transistor is electrically connected with the first electrode of the second thin film transistor, the first electrode of the second thin film transistor is electrically connected with the pixel electrode, and the second electrode of the second thin film transistor is electrically connected with the second electrode of the first thin film transistor.

2. The pixel structure according to claim 1, further comprising:
   a third thin film transistor comprising a gate electrode, a first electrode and a second electrode;
   wherein the gate electrode of the third thin film transistor is electrically connected with the gate line, the first electrode of the third thin film transistor is electrically connected with the data line, and the second electrode of the third thin film transistor is electrically connected with the pixel electrode.

3. The pixel structure according to claim 2, wherein a threshold voltage of the first thin film transistor is less than or equal to a threshold voltage of the third thin film transistor.

4. The pixel structure according to claim 1, wherein an amount of the first thin film transistor is 1, and an amount of the second thin film transistor is 1.

5. The pixel structure according to claim 1, wherein an amount of the first thin film transistor is 1, and an amount of the second thin film transistors is more than 1.

6. The pixel structure according to claim 1, wherein an amount of the first thin film transistor is more than 1, and an amount of the second thin film transistor connected with each of the first thin film transistors is 1.

7. The pixel structure according to claim 1, wherein an amount of the first thin film transistors is more than 1, and an amount of the second thin film transistors connected with each of the first thin film transistors is more than 1.

8. The pixel structure according to claim 5, wherein reverse breakdown voltages of the plurality of second thin film transistors are same with each other.

9. The pixel structure according to claim 8, wherein channel areas of the plurality of second thin film transistors are same with each other.

10. The pixel structure according to claim 5, wherein reverse breakdown voltages of at least two of the plurality of second thin film transistors are different from each other.

11. The pixel structure according to claim 10, wherein channel region areas of the at least two of the plurality of second thin film transistors are different from each other.

12. The pixel structure according to claim 10, wherein the amount of the second thin film transistors is more than or equal to 3, and the reverse breakdown voltages of the plurality of second thin film transistors are distributed in a manner of equal difference.

13. The pixel structure according to claim 10, wherein as the reverse breakdown voltage of the second thin film transistor increases, difference between the reverse breakdown voltages of every two second thin film transistors decreases.

14. A display panel, comprising the pixel structure according to claim 1.

15. A display device, comprising the display panel according to claim 14.

16. A driving method of the pixel structure according to claim 1, comprising:
   applying a gate voltage to the gate line and applying a data voltage to the data line; and
   controlling the gate voltage to be greater than or equal to a threshold voltage of the first thin film transistor and the data voltage to be greater than or equal to a reverse breakdown voltage of the second thin film transistor so that the pixel electrode is charged by the first thin film transistor and the second thin film transistor.

17. The driving method according to claim 16, further comprising:

controlling the gate voltage to be less than the threshold voltage of the first thin film transistor, or controlling the gate voltage to be greater than or equal to the threshold voltage of the first thin film transistor and the data voltage to be less than the reverse breakdown voltage of the second thin film transistor, so that the pixel electrode is not charged by the first thin film transistor and the second thin film transistor.

18. The driving method according to claim 16, wherein the pixel structure comprises a plurality of second thin film transistors, and reverse breakdown voltages of the plurality of second thin film transistors are different;

the higher the data voltage is, the more second thin film transistors are turned on, and the faster the pixel electrode is charged.

19. The driving method according to claim 16, wherein the pixel structure further comprises a third thin film transistor, and the third thin film transistor comprises a gate electrode, a first electrode and a second electrode;

the gate electrode of the third thin film transistor is electrically connected with the gate line, the first electrode of the third thin film transistor is electrically connected with the data line, and the second electrode of the third thin film transistor is electrically connected with the pixel electrode; and the driving method further comprises: controlling the gate voltage to be greater than or equal to a threshold voltage of the third thin film transistor so that the third thin film transistor is turned on and the pixel electrode is charged by the third thin film transistor; or controlling the gate voltage to be smaller than the threshold voltage of the third thin film transistor so that the third thin film transistor is not turned on and the pixel electrode is not charged by the third thin film transistor.

20. The pixel structure according to claim 2, wherein an orthographic projection of portions of the third thin film transistor except for an end, connected with the pixel electrode, of the second electrode of the third thin film transistor on a layer provided with the gate line is within the gate line.

* * * * *